United States Patent [19]

Pravda

[11] Patent Number: 5,303,565
[45] Date of Patent: Apr. 19, 1994

[54] ROTARY ABSORPTION HEAT PUMP OF IMPROVED PERFORMANCE

[75] Inventor: Milton F. Pravda, Towson, Md.

[73] Assignee: Conserve Resources, Inc., Prescott, Wash.

[21] Appl. No.: 29,619

[22] Filed: Mar. 11, 1993

[51] Int. Cl.$^5$ .......................... F25B 15/00; F25B 3/00
[52] U.S. Cl. ........................ 62/476; 62/499; 165/86
[58] Field of Search .............. 62/476, 487, 101, 324.2, 62/499; 165/86 H

[56] References Cited

U.S. PATENT DOCUMENTS

| | | | |
|---|---|---|---|
| 3,296,814 | 1/1967 | Lynch | 62/112 |
| 3,524,815 | 8/1970 | Hensel, Jr. | 252/69 |
| 3,559,419 | 2/1971 | Kantor | 62/476 X |
| 3,740,966 | 6/1973 | Pravda | 62/476 |
| 3,842,596 | 10/1974 | Gray | 60/39.66 |
| 3,911,694 | 10/1975 | Doerner | 62/499 |
| 4,475,352 | 10/1984 | Lazare | 62/101 |
| 4,553,408 | 11/1985 | Cross | 62/476 |
| 4,722,194 | 2/1988 | Kantor | 62/101 |
| 4,793,154 | 12/1988 | Cross | 62/499 |
| 5,009,085 | 4/1991 | Ramshaw | 62/476 |

Primary Examiner—Henry A. Bennet
Assistant Examiner—William C. Doerrler
Attorney, Agent, or Firm—Eugene D. Farley

[57] ABSTRACT

A rotary absorption heat pump assembly. The assembly comprises a generator (2), condenser (3), evaporator (4), absorbent cooler (5), and absorber (1), all operatively associated to function as components of an absorption-type heat pump of high efficiency and superior operating characteristics. The heat pump is characterized by the presence of a tapered cylindrical absorber (1) which receives and processes, in the form of a very thin peripheral film ("d"), a predetermined amount of absorbent solution. The absorber (1) is arranged in abutting end-to-end relationship to the generator (2), with which it communicates. The condenser (3) and evaporator (4) are arranged end-to-end outside of the absorber (1) and absorbent cooler (5), concentrically therewith and radially spaced therefrom.

17 Claims, 6 Drawing Sheets

FIG. 1A

ROTARY ABSORPTION HEAT PUMP OF IMPROVED PERFORMANCE

This invention relates to rotary absorption heat pumps o the general class described in U.S. Pat. No. 3,740,966 issued to Milton F. Pravda on Jun. 26, 1973.

BACKGROUND OF THE INVENTION

Absorption machines used as chillers and ice makers predate similar duty vapor compression machines by the better part of a century. With the advent of universal electrical usage and, more so, with the introduction of the chlorofluorocarbon refrigerants, vapor compression machines supplanted but did not completely eliminate absorption machines from the marketplace. Since the 1950's, vapor compression machines manufactured to condition room air not only cool in the Summer but heat in the Winter thereby assuming the characteristics of true heat pumps. Heat pumps thus are of two categories: rotary absorption heat pumps (RAHP's) and vapor compression heat pumps (VCHP's).

The conditions which initially heavily favored VCHP's in the marketplace have subsequently been somewhat altered. The world has become more conscientious about conserving energy, especially since the large increase in the price of energy which occurred during the mid 1970's. The economic balance here favors the absorption process, because it can utilize low-grade waste heat efficiently.

Also, with the recent recognition of the destructive behavior of chlorofluorocarbons (CFC's) on the earth's protective ozone layer, the heretofore ideal class of refrigerants for use in VCHP's has been eliminated, thus further tilting the balance in favor of the absorption process.

The RAHP's differ from conventional VCHP's both in their operating cycle and in their construction. The common cycle components in RAHP's and VCHP's are the evaporator and the condenser but thereafter the similarity ends. In the VCHP's, the vapor produced in the evaporator is increased in pressure by means of a mechanical pump and at the higher pressure it is cooled and liquified in the condenser. Subsequently, it is returned to the evaporator in order to complete the cycle. In the RAHP's, the refrigerant vapor produced in the evaporator is absorbed in a deliquescent material located within a component termed the absorber. The diluted deliquescent material is then transferred to a component named a generator within which the refrigerant vapor is separated from the material and its pressure is increased by the application of heat. The vapor at higher pressure is subsequently directed to a condenser wherein it is cooled and liquified before it is returned to the evaporator in order to complete the cycle.

Essentially, the absorber, generator, and deliquescent material or absorbent of RAHP's replace the mechanical compressor of VCHP's. In place of the mechanical energy needed to drive the compressor of VCHP's the RAHP's employ low-grade heat to separate the refrigerant from the absorbent material and, concomitantly, increase the refrigerant vapor pressure in the generator.

In order to capitalize on the advantages accruing to rotation, rotary VCHP's have been built and tested. They have proven to be more compact and quieter in operation than stationary VCHP's. However, rotating seals have compromised hermeticism and market acceptance has not been achieved.

In order to retain object hermeticism and to simultaneously employ waste heat, the rotating VCHP construction disclosed in Doerner U.S. Pat. No. 3,863,454 has been advocated. However, the Doerner design retains its dependence on clorofluorocarbons for the refrigerant and possibly for the boiler power fluid, in addition to requiring a high-temperature heat source for its operation.

It is the general purpose of the present invention to formulate the absorption heat pump process into a rotating unitary construction wherein the properties of rotation are used to simplify the procedure so as to result in the provision of a compact and mechanically simple heat pump unit, thereby enhancing the popularity of the absorption type unit in the marketplace.

It is another important object of the present invention to conserve energy by circumventing the wasteful process of converting the energy in primary fuel to mechanical or electrical energy, which energy subsequently is targeted to operate cooling equipment.

Still a further object of the present invention is the provision of a rotary absorption heat pump unit which is of compact, unitary construction; which is tolerant of changes in air temperature, operating rotational speed and generator temperatures; and which minimizes the undesired occurrence of crystallization of the absorbent solution during operation or down time of the heat pump unit.

Another object of the present invention is to reduce the physical size of RAHP's by constructing their evaporator and condenser components to be concentric and coaxial with the absorber and generally locating them radially outboard from the absorber.

It is a further object of the present invention to improve the efficiency and capacity of RAHP's by formulating a very thin film of absorbent within the absorber of such a thickness and of such a residence time that the absorption process is brought to an optimum completion.

SUMMARY OF THE INVENTION

The rotary absorption heat pump of the invention comprises a plurality of enclosed, interconnected components or chambers mounted for rotation as a group in such a manner that the evaporator and condenser are located concentric with and radially outboard of the absorber and absorbent cooler. In combination with the generator, these elements form a group which is airtight and liquid tight.

A refrigerant working fluid is used which undergoes evaporation and condensation. These processes take place at two pressure levels. However, instead of employing a mechanically driven compressor for obtaining different pressure levels, a heat-operated generator in combination with a tapered absorber is used. Consequently heat, rather than a mechanically or electrically-driven compressor, for the most part supplies the energy for operation.

The invention is specially adapted to employ waste heat, such as heated effluents from industrial processes, radiator heat and exhaust hot gases from internal combustion engines, solar heat, or even heat obtainable by burning low-cost hydrocarbons or other fuels.

The interconnected components or chambers include a generator in which, by the application of heat, refrigerant is separated from absorbent by conversion into refrigerant vapor and a concentrated liquid absorbent fraction; a condenser in which refrigerant vapor at pressure is condensed and liquified, thereby releasing heat of condensation; an evaporator for vaporizing the liquified refrigerant vapor, thereby absorbing heat of vaporization and cooling the evaporator walls and associated fins; and a tapered absorber, noted above, wherein the concentrated absorbent is disposed along a tapered and cooled inner wall in a very thin traveling film. This ensures that the refrigerant vapor from the evaporator is absorbed as completely and efficiently as practical, thereby producing the original diluted absorbent from which refrigerant vapors are again separated in the generator to complete the cycle.

As will become apparent hereinafter, the capacity of a rotating absorption heat pump is primarily determined by the capacity of its absorber, which may be viewed in the broader perspective as an efficient chemical contactor.

Among the parameters that determine the capacity of the absorber are its axial length, mean radial diameter, taper angle, and its speed of rotation. For a given absorber capacity, any one of these parameters may be changed and rules will be presented hereinafter disclosing the changes which are required in one or more of the other parameters in order to maintain the absorber capacity constant. The absorber may be changed in shape within the rules provided in order better to suit the intended service of the RAHP or other application.

BRIEF DESCRIPTION OF THE DRAWINGS

The invention is illustrated in the following drawings which are diagrammatic, and in which:

FIGS. 1A and 1B comprise in combination a longitudinal sectional view of the RAHP of my invention, showing the interior construction of one of its embodiments;

DESCRIPTION OF SPECIFIC EMBODIMENTS OF THE INVENTION

Figure 1A:
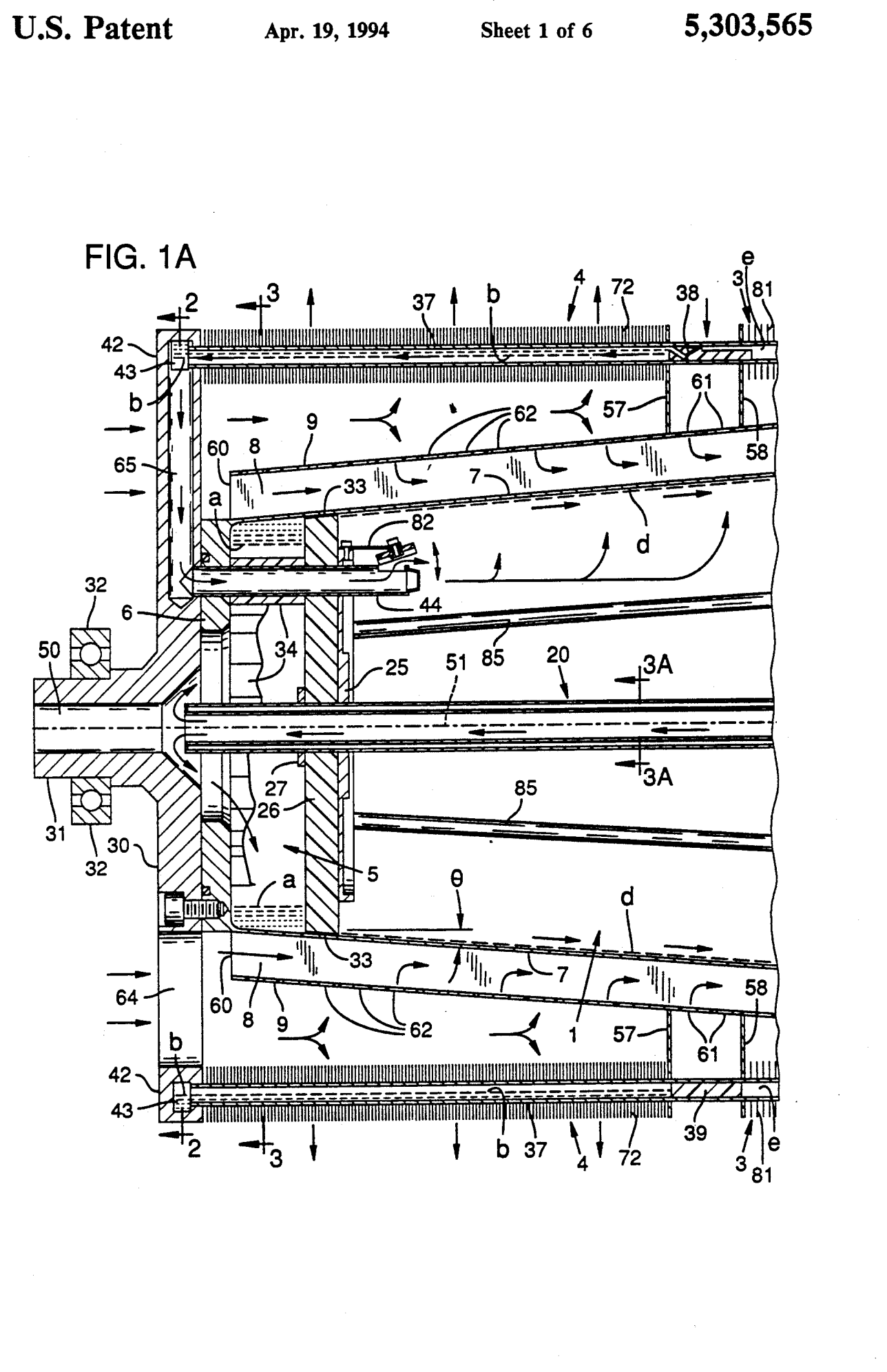
Figure 1B:
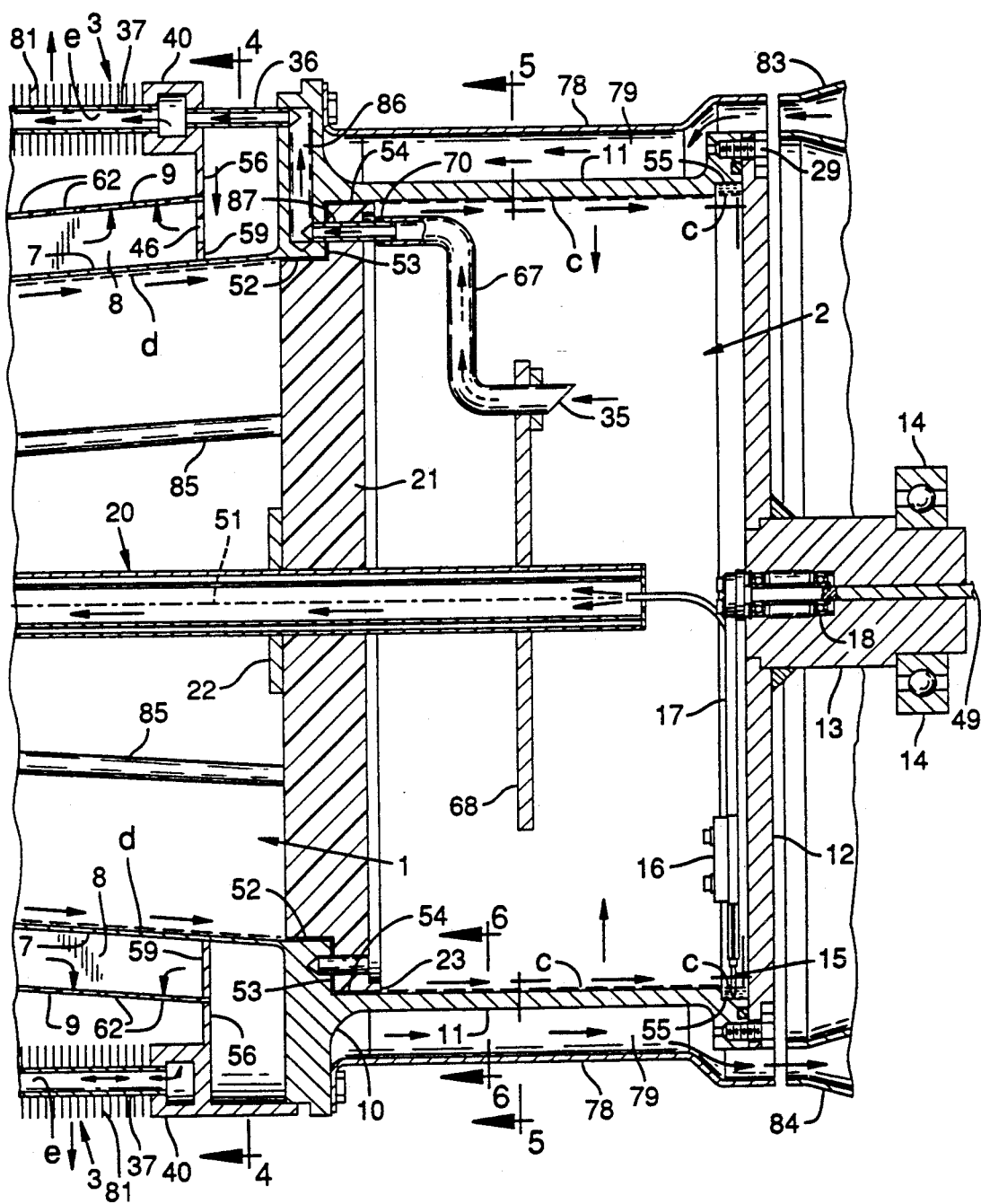

Referring to FIGS. 1A and 1B, there is shown an absorber 1, a generator 2, a condenser 3, an evaporator 4 and an absorbent cooler 5.

Structurally, absorber 1, absorbent cooler 5, and generator 2 comprise a first subassembly. Condenser 3, evaporator 4, and absorber end plate 30, absorber bearing shaft 31, and outboard absorber bearing 32 comprise a second subassemnly. Absorber insulating barrier 26, absorbent transfer tube 20, generator insulating barrier 21, refrigerant vapor tube 67, and tube support flange 68 comprise a third subassembly. Pitot tube pump 17, generator end plate 12, generator bearing shaft 13, and outboard generator bearing 14 comprise a fourth subassembly. The preferred sequence of final assembly is first, second, third, and fourth in that order, although any order is possible.

Absorber 1 is internally bounded by absorber insulating barrier 26, absorbent transfer tube 20, generator insulating barrier 21, and tapered absorber wall 7. It comprises, broadly stated, a hollow frustum of a right circular cone, outwardly tapering in the downstream direction.

Refrigerant vapor produced by the boiling of refrigerant in evaporator 4 is supplied to the absorber through typical evaporator exhaust tube 44 which penetrates absorber insulating barrier 26. Concentrated liquid absorbent enters absorber 1 from absorbent cooler 5 by means of typical pressure reducing slots 33 cut into the circumferential perimeter of absorber insulating barrier 26. The liquid absorbent forms a very thin film "d" on the order of 0.003 inch (0.076 mm) thick on tapered absorber wall 7. As the very thin absorber film travels under the influence of rotation from the absorber insulating barrier 26 toward generator insulating barrier 21, it absorbs refrigerant vapor and in the process it becomes diluted and simultaneously liberates heat of absorption.

Figure 5:
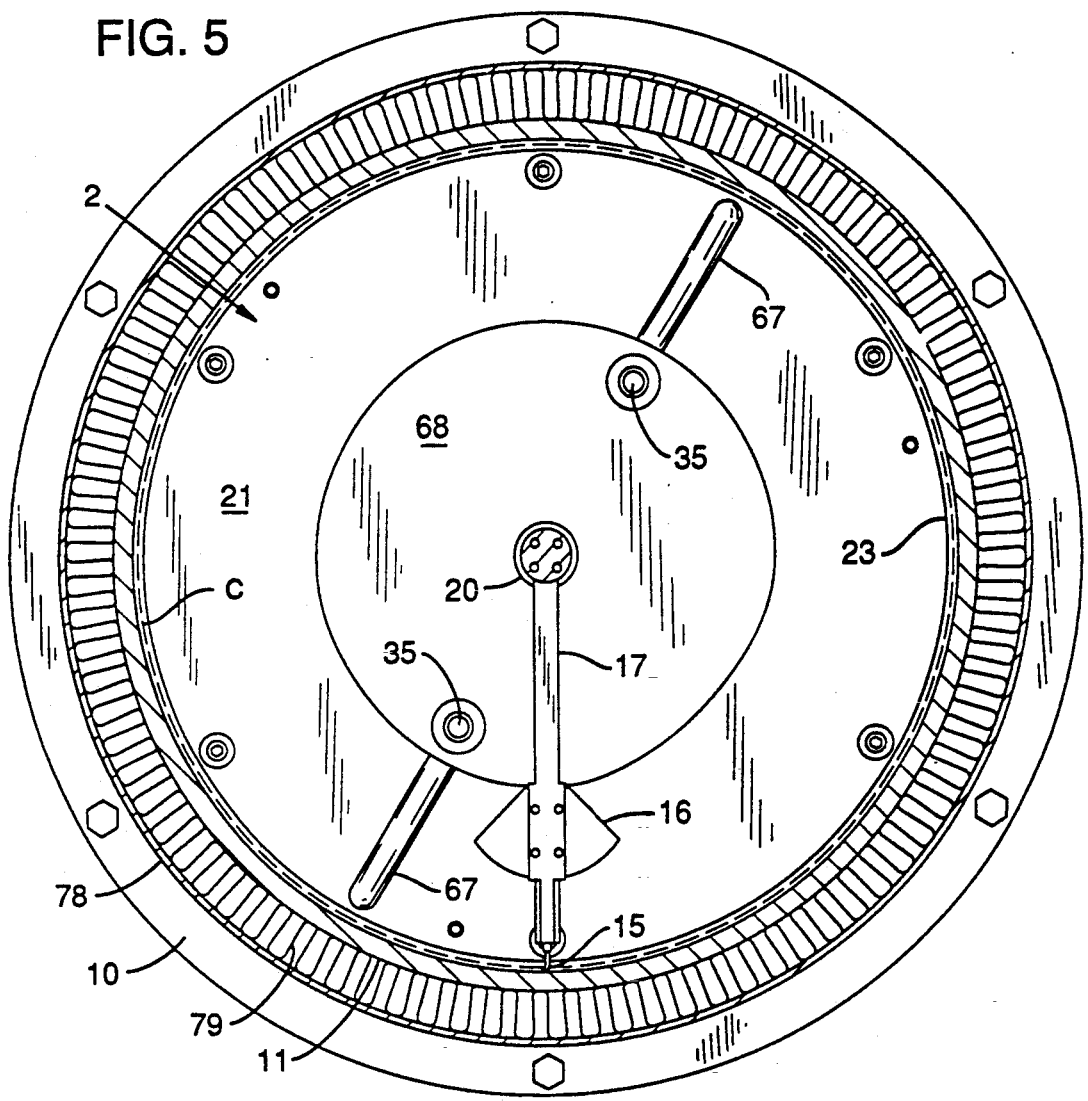
FIG. 5 is a transverse sectional view taken along line 5—5 of FIG. 1B.
Figure 6:
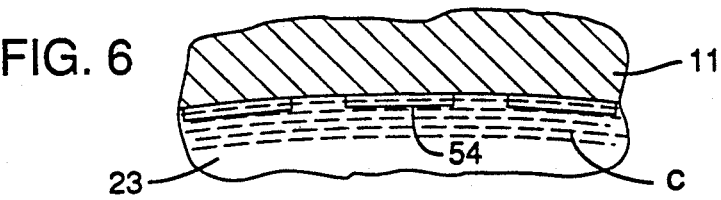
FIG. 6 is an enlargement of a fragmentary section of FIG. 5.

The heat of absorption must be removed if the process is to continue. In the illustrated embodiment, heat of absorption is removed by typical absorber fins 8, a multiplicity of which are attached to the outer surface of tapered absorber wall 7 occupying the entire wall surface both circumferentially and axially. The diluted very thin absorber film "d" leaves absorber by annular passage 52 between generator insulating barrier 21 and absorber-generator flange 10, typical radial slot 53, and enters generator 2 through typical circumferential slot 54 as illustrated in FIGS. 5 and 6.

Ambient vapor pressure within absorber 1 is less than the ambient vapor pressures in generator 2 and absorbent cooler 5. The concentrated liquid absorbent in absorbent cooler 5 must be reduced in pressure and distributed uniformly around the circumference at the juncture of absorber insulating barrier 26 and tapered absorber wall 7. As is well known, any liquid flowing through a pipe or conduit will experience a pressure drop. Accordingly, film-forming, pressure-reducing slots 33 are cut into the circumferential perimeter of absorber insulating barrier 26 such that a closed axial passage is formed when absorber insulating barrier 26 is positioned against tapered absorber wall 7. Each pressure reducing slot 33, of which there are a number equally disposed around the circumference of insulating barrier 26, is of such a width and depth that the ambient pressure of the concentrated liquid absorbent is reduced from that within absorbent cooler 5 to that within absorber 1. Concomitantly, the distribution of slots circumferentially assures that concentrated liquid absorbent is disposed uniformly on tapered absorber wall 7.

As the liquid absorbent traverses the axial length of tapered absorber wall 7 it becomes diluted with absorbed refrigerant vapors and, at generator insulating barrier 21, it must be pumped into generator 2 which is at a higher pressure. This task is accomplished by radial slots 53 of which there are a number distributed circumferentially between generator insulating barrier 21 and absorber-generator flange 10. Radial slots 53 are formed in a fashion similar to pressure reducing slots 33, except that they may be cut into absorber-generator flange 10. As is well known, acceleration forces, produced under the impetus of rotation, force the liquid absorbent radially outward. In the present case, this action is counterbalanced somewhat by the higher pressure existing in generator 2. The radial length of radial slots 53 is such that the centrifugal forces exert a pressure within the liquid absorbent greater than the counter-balancing higher pressure in generator 2 and, thereby, there is caused a flow from absorber 1 to generator 2. In the average RAHP unit, the optimum film thickness "d" lies within the range of from about 0.1 to about 5.0 mils (0.00254 to about 0.127 mm).

Means is provided for ensuring that the thickness of the liquid absorbent film in absorber 1 remains essentially constant during operation of the apparatus.

The heat-pumping capacity of the RAHP is at a maximum when the absorbent film thickness is uniform everywhere at each axial location. To achieve this end, it is imperative that absorber wall 7 be concentric with the axis of rotation 51 along its entire surface. Practically, it is not reasonable to expect mechanical perfection. The consequences of imperfection are severe. If tapered absorber wall 7 center-line is offset from the axis of rotation 51 of the unit by one mil (0.0254 mm), then the capacity will be reduced by about 10%.

Accordingly, there are provided tapered absorber wall partitions or baffles 85, extending axially from absorber insulating barrier 26 to generator insulating barrier 21. These protrude from tapered absorber wall 7 by about two times the thickness of the flowing film on the inner surface of the absorber wall.

Figure 4:
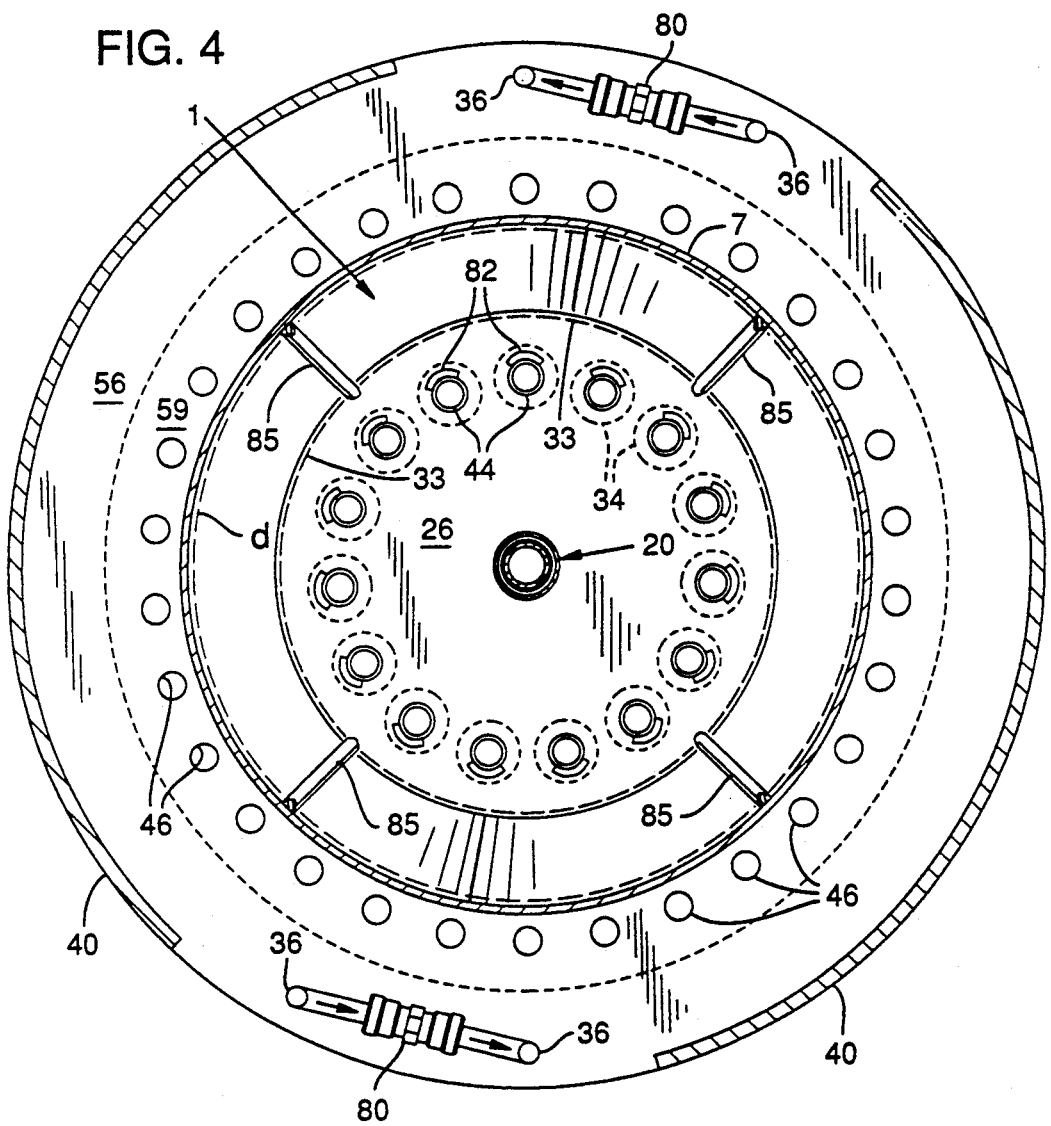
FIG. 4 is a sectional view along line 4—4 of FIG. 1B.

As illustrated in FIG. 4, the surface of absorber wall 7 is divided into quadrants wherein, within each quadrant, the liquid absorbent is isolated from that of the other quadrants by means of partitions 85. Consequently, flow of liquid between quadrants is eliminated and film thickness remains essentially uniform even when tapered absorber wall 7 centerline is eccentric with respect to the axis of rotation 51.

Typical dimensions for the partitions 85 are 6 mils high (0.152 mm), 10 mils (0.254 mm) wide and the length of the tapered absorber wall. The partitions may be made part of wall 7 by various accepted procedures such as electroplating, electroless plating, chemical milling, plasma spraying, etc. They also may be inserted into absorber 1 as separate subassemblies, in which case they may be made of plastic or other suitable, material.

Although the taper angle $\Theta$ of absorber wall 7 is a design variable, depending upon the capacity and other characteristics of the installation, in the usual installation a taper angle of from about 0.1° (0.001745 rad) to less than arctan of twice the mean radius of the absorber divided by its axial length is suitable. Preferred values of theta lie within the range of from about 2.0° (0.0349 rad) to about 7.0° (0.1222 rad).

Generator 2 is internally bounded by generator insulating barrier 21, generator shell 11, and generator end plate 12. Diluted absorbent liquid from absorber 1 enters generator 2 at the termination of circumferential lip 23 which is an annular extension of generator insulating barrier 21. The diluted absorbent liquid is heated and thereby is depleted of refrigerant. Thereupon it is converted to concentrated liquid as it travels axially in a relatively thin layer "c" along the inner surface of generator shell 11 from circumferential lip 23 to pitot tube reservoir 55. The impetus for moving the absorbent liquid film axially derives from the slightly thicker film at the location of circumferential lip 23 compared to its thickness near the location of the pitot tube reservoir 55, thereby creating a slight taper within the absorbent liquid film. The effect is precisely the same as that produced by the mechanical taper of tapered absorber wall 7 in absorber Alternatively, the inner surface of generator shell 11 can be mechanically tapered.

Generator 2 intakes diluted absorbent liquid and by means of heat applied to the outer surface of generator shell 11 boils off a part of the refrigerant, thereby forming superheated refrigerant vapor which, subsequently, discharges into refrigerant vapor entrance 35. After axially traversing the inner surface of generator shell 11, the concentrated absorbent liquid enters pitot tube reservoir 55. A fixed rate amount of absorbent is pumped out of pitot tube reservoir 55 and into absorbent transfer tube 20 by pitot tube pump 17.

Correspondingly, as absorber 1 requires two influents to operate properly, generator 2 gives birth to two effluents during its operation. These classify themselves into the vapor cycle and the liquid cycle. From transfer tube 20, the absorbent liquid commutes only along absorbent cooler 5, wherein excessive heat is removed, to absorber 1 wherein, it is received concentrated and leaves diluted, and to generator 2 wherein it is received diluted and leaves concentrated.

The refrigerant vapor commutes from generator 2, wherein it is separated from diluted absorbent liquid, to condenser 3 wherein it is cooled and liquified, to evaporator 4 wherein it is revaporized, to absorber 1 wherein it is absorbed in concentrated absorbent liquid and thence, bound within diluted abs rbent liquid, it proceeds back into generator 2 in order to complete the cycle.

Condenser 3 is internally bounded by refrigerant vapor entrance 35, insulating plug 39, and condenser/evaporator tube 37. Superheated refrigerant vapor enters refrigerant vapor tube 67 located within generator 2 at refrigerant vapor entrance 35. Refrigerant vapor tube 67 couples to a tube extension 87 penetrating generator insulating barrier 21 and is made liquidtight by refrigerant vapor tube seal 70.

Superheated refrigerant vapor is conducted into radial holes 86 provided in absorber-generator flange 10 to which is attached off-set connecting tube 36 as illustrated in FIGS. 1B, 4. The other end of off-set connecting tube 36 is join to condenser header 40. Union 80 permits assembly and disassembly of the first and second assemblies as hereinbefore defined.

Condenser/evaporator tube 37 in condenser 3 location is affixed with condenser fin 81. Condenser fin 81 is made from a good heat conducting material such as copper or aluminum and is a continuous thin annular disk so as to provide radial restraint against centrifugal forces for condenser/evaporator tube 37.

Condenser 3 is an annular cylindrical shape comprised of a multiplicity of condenser fins 81 and condenser/evaporator tubes 37. Each of many condenser/evaporator tubes 37 connects to condenser header 40; however, only a few connect to evaporator 4 by means of liquid trap 38, the remainder being isolated and insulated from the evaporator portion of condenser/evaporator tube 37 by means of insulating plug 39.

The function of condenser 3 is twofold; first to liquify superheated refrigerant vapors emanating from generator 2, and second to provide airflow through the multiplicity of absorber fins 8 and, subsequently, through the multiplicity of condenser fins 81. Heat must be removed from absorber 1 in order to remove the heat of absorption and heat must be removed from condenser 3 in order to remove the heat of condensation, the sum total of these heats being greater than the heat input to the generator.

Evaporator 4 is internally bounded by condenser 3 and the afore-described insulating plug 39 and liquid trap 38, by the evaporator portion of the continuous condenser/evaporator tube 37, by evaporator header 42 to which all tubes are attached, by radial hole 65 which intercepts annular space 43 within evaporator header 42, and evaporator exhaust tube 44 which proceeds from radial hole 65 and terminates in absorber 1.

Evaporator 4 receives liquified refrigerant from condenser 3 by virtue of liquid trap 38 of which there are a few equally spaced circumferentially. The function of liquid trap 38 is to isolate evaporator 4 vapor volume from the higher pressure condenser 3 vapor volume while simultaneously permitting the flow of liquified refrigerant from condenser 3 to evaporator 4. There is no need for each condenser/evaporator tube 37 to contain a liquid trap because condenser header 40 redistributes the liquified refrigerant in condenser 3 and evaporator header 42 redistributes the liquified refrigerant in evaporator 4 among all connected condenser and evaporator tubes, respectively.

The vapor pressure within the condenser portion of condenser/evaporator tube 37 is determined by generator 2, whereas the vapor pressure within the evaporator portion of condenser/evaporator tube 37 is determined by absorber 1. The vapor pressure within the evaporator is well below the vapor pressure within the condenser and, by design, the liquified refrigerant "b" occupies about one-half of the internal volume of the evaporator portion of condenser/evaporator tube 37 whereas liquified refrigerant occupies only a small percentage of the internal volume of the condenser portion of condenser/evaporator tube 37.

It is known that at the high centrifugal forces experienced by condenser/evaporator tube 37 during operation, the refrigerant contained in the evaporator is vaporized by evaporation from the free surface. Heat transfer from the tube wall to the liquid is by convection. Coincidentally, heat transfer only occurs where the inside tube wall is wetted by liquid refrigerant. This is in contrast to the method of heat transfer within the condenser portion of condenser/evaporator tube 37. There maximum heat transfer during liquefaction occurs when the inside tube wall is not wetted.

The vaporization of refrigerant cools the bulk liquid refrigerant within condenser/evaporator tube 37. This, in turn, cools the tube wall and attached evaporator fin 72 which, in turn, cools and extracts heat from air passing the fin in close proximity. The vaporization of refrigerant in the evaporator adds to the inventory of vapor in the absorber and the process can proceed only as long as the absorber continuously extracts the excess inventory of vapor.

Figure 2:
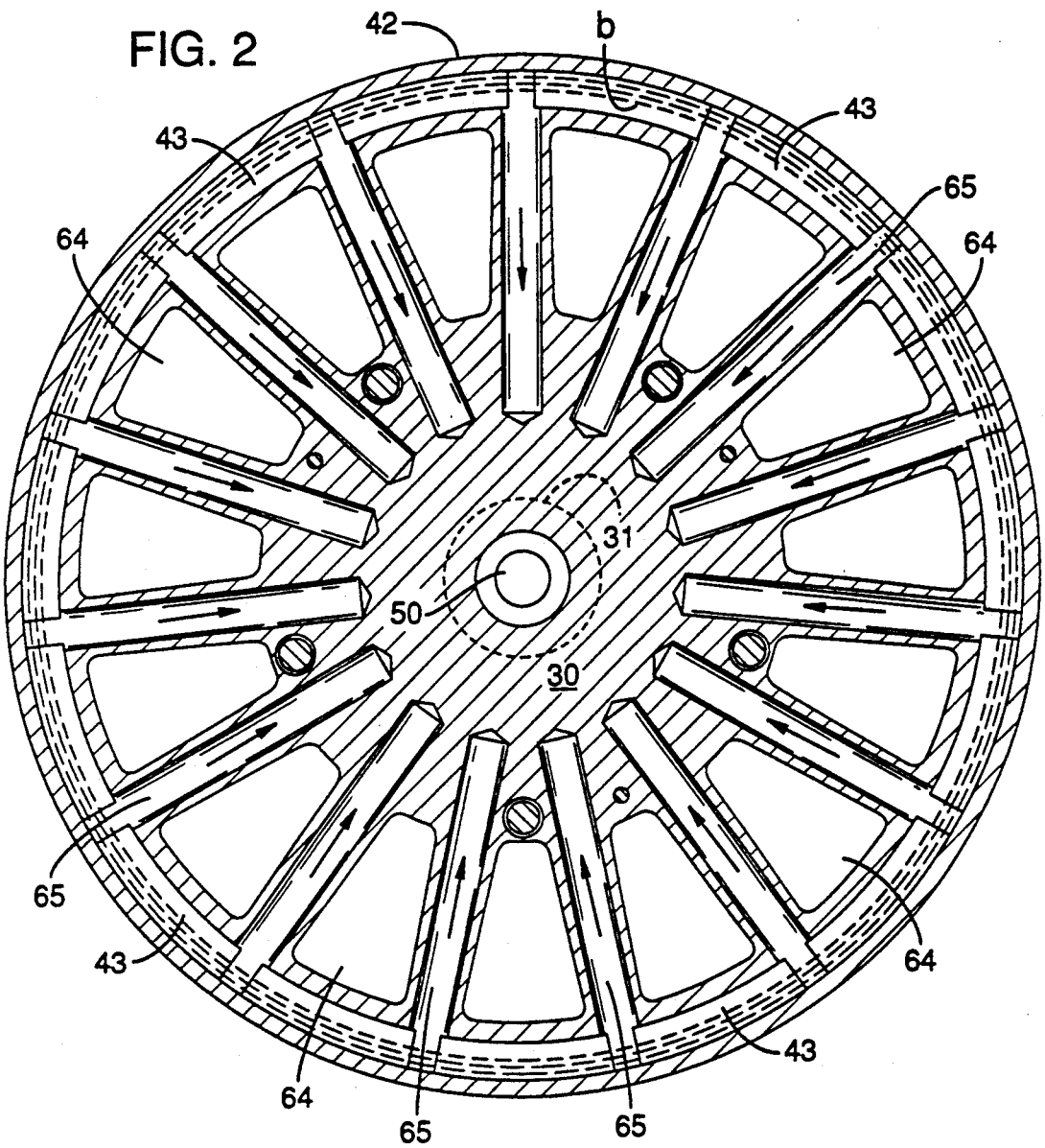
FIG. 2 is a transverse sectional view along line 2—2 of FIG. 1A.
Figure 3A:
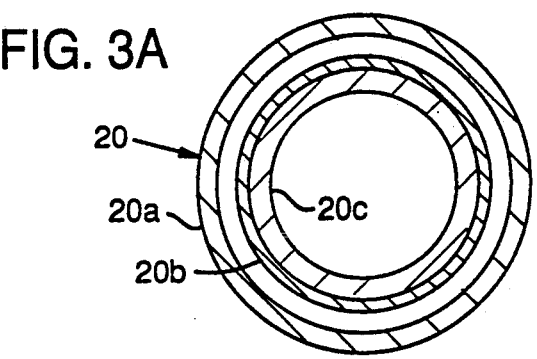
FIG. 3A is a detail section along line 3A—3A of FIG. 1A.
Figure 3:
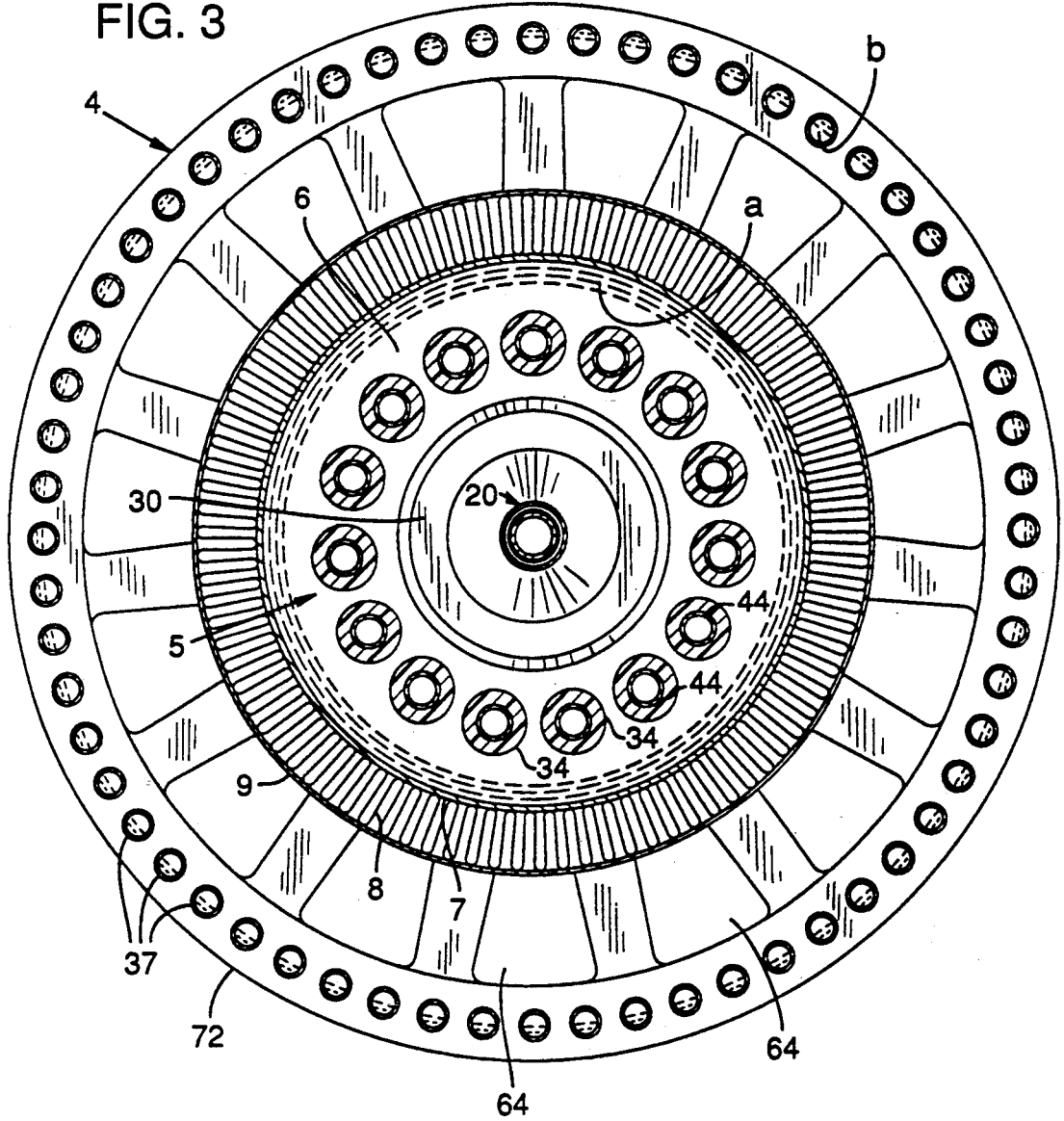
FIG. 3 is a transverse sectional view along line 3—3 of FIG. 1A.

Absorbent cooler 5 is internally bounded by absorber flange 6, absorber end plate 30, tapered absorber wall 7, insulating sleeve 34, absorbent transfer tube 20, and absorber insulating barrier 26 as depicted in FIGS. 1A, 2, and 3. Absorbent cooler 5 receives a designated massflow rate of hot concentrated absorbent liquid from generator 2 by means of pitot tube pump 17 and insulation-packed absorbent transfer tube 20. In the present invention, the vapor pressure within absorbent cooler 5 is the same as the vapor pressure within generator 2; however, this need not be the case.

The concentrated absorbent liquid "a" within absorbent cooler 5 is cooled to somewhat above the condenser temperature. The refrigerant vapor which arrives superheated from generator 2 is cooled, giving up the very small amount of heat contained in superheat, but it will not condense because the heat removal capacity of absorbent cooler 5 is not sufficient. As heretofore described, the pressure reducing slot 33, of which many are located around the periphery of absorber insulating barrier 26, reduces the overhead pressure on the concentrated absorbent liquid and acts to form the very thin film "d" on tapered absorber wall 7.

Insulating sleeve 34 prevents vapor condensation on evaporator exhaust tube 44 during operation. In the region of absorbent cooler 5, tapered absorber wall 7 is cooled by air passing over absorber fin 8 of which a number are attached to the outer surface of tapered absorber wall 7.

Superheated refrigerant vapor produced in generator 2 by heating diluted absorbent liquid is condensed in condenser 3, thereby yielding heat of condensation at a temperature below the temperature of generator 2; the liquified refrigerant is transferred to evaporator 4 wherein it is evaporated at a low temperature and consumes heat of vaporization and the vapor thus produced is absorbed in a very thin traveling film "d" of concentrated absorbent liquid within absorber 1, liberating heat of absorption at a temperature intermediate between the condenser temperature and the evaporator temperature. In order to increase the effectiveness of absorber 1, hot concentrated absorbent liquid from generator 2 is precooled in absorbent cooler 5 with the liberation of heat at an intermediate temperature before the absorbent liquid is permitted to enter the absorber.

In an otherwise loss-free system operating in steady state, the heat consumed by generator 2 and evaporator 4 must equal the energy liberated by absorber 1, condenser 3, and absorbent cooler 5 as required by the law of conservation of energy. In the cooling mode, the coefficient of performance of the cycle is given by the ratio of heat absorbed by the evaporator divided by the heat consumed by the generator, the energy of rotation being neglected. In the heating mode, the coefficient of performance of the cycle is given by the heat liberated by the absorber, absorbent cooler, and the condenser divided by the heat consumed by the generator, the energy of rotation being neglected. If the coefficient of performance in the cooling mode is 0.5, then the coefficient of performance in the heating mode is 1.5, which means that for every BTU (1055J) of fuel energy consumed, 1.5 BTU (1583J) of heat energy can be delivered to warm a building. In regions of the world where air conditioning is not important, the heat leverage offered by heat pumps is proving to be an attractive method of conserving energy.

The thermal energy that must be applied to and extracted from the various RAHP components in order to permit the cycle to proceed efficiently can take any one of several forms. In the embodiment illustrated, hot gas and air are the energy carriers. Because gas and air are relatively poor media for heat transfer, extended surfaces are employed, as is the normal custom, in order to enhance heat transfer from cylindrical and tubular surfaces.

FIG. 5 illustrates the placement of generator fin 79 on generator shell 11 outer surface. Generator fin 79 is encompassed by metallic sheath 78. As shown in FIG. 1B, generator fin 79 is oriented axially and intentionally does not extend all the way to absorber-generator flange 10 in order to provide space for a circumferential gas flow. This permits return gas flow in proximate of a diametrically opposite generator fin 79. Hot gas from the selected heat source is directed axially through a 180° (3.142 rad) annular nozzle 83 to the annular space between generator end plate 12 and metallic sheath 78.

The gas is exhausted by a mirror image 180° (3.142 rad) annular nozzle 84.

In the process of traversing generator fin 79 first axially in a direction toward absorber 1 and then axially in a direction away from absorber 1, the hot gas heats the fins it contacts. These, in turn, heat generator shell 11 by conduction. Finally, the heat is received by the relatively thin layer "c" of diluted absorbent liquid within generator 2 which, thereupon, expells refrigerant vapor by the quiescent process of evaporation.

FIGS. 1A and 3 illustrate the placement of absorber fin 8 on absorber 1, evaporator fin 72 on evaporator 4, and by similitude, condenser fin 81 on condenser 3. Condenser fin 81 and evaporator fin 72 are secured to condenser/evaporator tube 37 by hydraulically or mechanically expanding the tube into compressive contact with the fins. The fin density is less in condenser 3 than in evaporator 4 but, in either case, the density must not be so great that the fin array acts as a filter for common air contaminants, in which case the heat exchange function would become ineffective.

The condenser airside design must be adequate to remove the heat of condensation within the condenser; to provide the airflow necessary to remove the heat of absorption in the absorber; and to provide the airflow needed to cool the absorbent cooler. Because the condenser airflow contains heat energy extracted from absorbent cooler 5, absorber 1, and condenser 3, it represents the useful output of the RAHP when operating in the heating mode.

The density of condenser fin 81 array is typically about 8 fins per inch (3.15 fins per cm), creating a spacing between fins of somewhat more than 3/32 inch (2.4 mm). At this spacing, viscous drag forces acting during rotation on the air entrained within the condenser fin 81 annular assembly may not be sufficient to assure the development of the pressure head needed to force the specified airflow through the array of absorbent cooler 5 and absorber 1 fins shown in section in FIG. 3. If not, vanes, not shown, may be stamped or formed onto the annular surface of condenser fin 81. They are so located as to be between the holes provided for condenser/evaporator tube 37.

Airflow to and from condenser 3 is substantially radial. Airflow to condenser 3 typically derives from condenser section perforations 62 located in plastic sheath 9. To achieve maximum pressure recovery, condenser 3 may be surrounded by a housing, not shown, which has the familiar logarithmic spiral shape.

Absorbent cooler 5 and absorber 1 obtain air from absorber air inlet 60, from perforations 62 in plastic sheath 9 located within evaporator 4 section, from isolation section perforation 61, and from typical air inlet hole 46 located in absorber air barrier 59. Absorber fin 8 is perforated with many small holes since it has been shown experimentally that the channel crossflow, which such perforations permit, prevents the formation of very thick boundary layers. Consequently, heat transfer is greatly improved without the commensurate increase in pressure drop. Additionally, perforations are necessary in the aforementioned airflow arrangement so that all air spaces are communicative.

The insulating property of plastic sheath 9 is an important consideration in the axial region between absorber end plate 30 and evaporator air barrier 57. Similarly important in this region are perforations 62. This is to insure that convective heat transfer is prohibited between absorbent cooler 5, absorber 1, and evaporator 4. The negative pressure within absorber fin 8 array airspace dictates an air inflow to the absorber cooling airstream. This air inflow removes any convectively or conductively heated air which might otherwise linger near the surface of plastic sheath 9.

When the RAHP is operating in the air conditioning mode, only the airflow output of evaporator 4 is utilized. Because the thermal driving potential of absorption machines is smaller than that of vapor compression machines, evaporator 4 must be of increased size in order to obtain a competitive dehumidifying performance. The density of evaporator fin 72 array is typically about 12 fins per inch (4.72 fins per cm). The spacing between fins is somewhat more than 1/16 inch (1.6 mm). As can be observed from FIG. 3, evaporator fin 72 is also annular; however, here vanes are not needed.

In order to obtain satisfactory airside heat transfer in the evaporator, a circular shroud, not shown, slightly spaced from its outside circumference, may surround evaporator fin 72 array. A sector of the shroud is removed and replaced by a duct through which evaporator exhaust airflow is directed, as shown by the arrows of FIG. 1A. The size of the duct is fixed by the desired airflow, which per ton of cooling capacity is about 500 SCFM (849.5 cubic meters/hour per 3515 watts). For the shroud and duct thus described, it has been demonstrated experimentally and confirmed analytically that the airflow in the duct is directly related to the volume of air contained between the fins in the annular array sector facing the duct multiplied by the rotational speed of the array; consequently, the duct can be sized to provide the specified airflow at the operating speed.

Airflow for absorber 1, absorbent cooler 5, condenser 3, and evaporator 4 enters the RAHP axially from absorber bearing shaft 31 side and passes through radial opening 64, shown in section in FIG. 2, located in absorber end plate 30. As shown in FIG. 1A, radial opening 64 permits airflow to enter absorber air inlet 60 and also the space circumscribed by plastic sheath 9, the inside diameter of evaporator 4 and evaporator air barrier 57. The airflow which enters absorber air inlet 60 and which travels axially along absorber fin 8 array extracts heat of absorption from tapered absorber wall 7 thus maintaining it at the specified temperature and, thereby, permitting the absorption process to continue within the very thin traveling film of absorbent on the inner surface of tapered absorber wall 7.

The RAHP cycle components which determine the size and configuration of the machine are the absorber and evaporator. Of these, the absorber exerts the more profound effect. As already stated, the absorber may be visualized as a chemical contact reactor which, in the present invention, causes the removal of refrigerant vapor by a very thin traveling film "d" of absorbent. When the film of absorbent enters absorber 1 from absorbent cooler 5, it is deficient in refrigerant and its temperature has decreased sufficiently so that it vigorously attracts refrigerant vapor.

Absorbed refrigerant vapors dilute the near surface of the very thin absorbent film and the heat of absorption raises the near surface temperature. This temperature increase is dissipated by means of conduction through the film, tapered absorber wall 7, absorber fin 8, and thence by convection into the proximate airstream. The concentration gradient of refrigerant within the thin absorbent film is dissipated by the process of mass diffusion. Neither the temperature nor mass dissipative processes proceed instantaneously; therefore, in practical engineered systems they are not taken to completion. The very thin films employed herein, however, permit these processes to be taken to a higher degree of completion than is otherwise encountered in normal engineering practice.

The rate at which refrigerant vapor is absorbed in absorbers of the present invention excluding enhancement by augmentation, for a uniform thin film, and in the absence of noncondensible gases is given by:

$$M = C\Omega \left[ \left( \frac{D^3 \rho^5}{\mu} \right) (L^3 R^5 N^2 \sin \theta) \right]^{\frac{1}{4}}$$

M = Rate of absorption
C = System constant
$\Omega$ = Absorber constant
D = Absorbent diffusion coefficient
$\rho$ = Absorbent density
$\mu$ = Absorbent viscosity
L = Absorber length
R = Absorber mean radius
N = Absorber rotational speed
$\Theta$ = Absorber wall taper angle The system constant C is an inverse function of the absorbent throughput rate (i.e., the rate of pumping of pitot tube pump 17) divided by the rate of absorption. The latter is called the circulation ratio. A large circulation ratio signifies that the spread between the absorbent concentration entering the generator and leaving the generator is small; the converse is true for a small circulation ratio. For a RAHP of the present invention employing lithium bromide as the absorbent and water as the refrigerant, a circulation ratio of 8.3 is preferred, although values between 7 and 10 are permissible and yield values of C between 1.60 and 1.14. For other absorbent-refrigerant combinations such as aqueous solutions of lithium bromide and lithium iodide, where crystallization may be less severe, circulation ratios of less than 7 are preferred.

The absorber constant $\Omega$ is a complex inverse function of the completion efficiency. A preferred completion efficiency for the present invention is 92% for which the value of $\Omega$ is 0.9652 although values of completion efficiencies between 95% where $\Omega = 0.8674$ and 90% where $\Omega = 1.0185$ are acceptable. Very high completion efficiencies are not acceptable for RAHP's; for example, a completion efficiency of 99.99% yields a value for $\Omega$ of 0.3789, which represents a severe penalty on machine capacity. High completion efficiencies are acceptable in chemical contactors.

The diffusion coefficient, density, and viscosity are properties of the absorbent comprising the thin film and must be determined at the film temperature and composition. For lithium bromide absorbent at a temperature of 125° F. (51.67° C.) and a concentration of 62 weight percent, water being the diluent, the parenthetical property value taken to the one-fourth power in the prior expression is $2.11 \times 10^{-3}$ lbm/ft²−s$^{\frac{1}{2}}$($1.03 \times 10^{-3}$ g/cm²−s$^{\frac{1}{2}}$ and when combined with the preferred dimensionless values of C and $\Omega$, the rate of absorption in pounds per second becomes:

$$M = 2.77 \times 10^{-3} (L^3 R^5 N^2 \sin\Theta)^{\frac{1}{4}}$$

Typically if N is 60 revolutions second (377 rad/s) if $\Theta$ as measured with respect to the axis of rotation 51 is 4.25 degrees (0.0742 rad), if R is 4 inches (101.6 mm), and if L is 18 inches (457.2 mm), then the value of M is $3.84 \times 10^{-3}$ pounds per second (1.74 g/s). For a typical net value for the enthalpy for vaporizing water within the evaporator of 960 Btu per pound (2231 J/g), the gross cooling capability represented by this flow rate is 3.69 Btu/second (3893 W), which is equivalent to 1.11 tons. The mean thickness of film "d" on tapered absorber wall 7 in this example is 1.81 mils (0.046 mm).

It is clear that a given value of M can be satisfied by selecting various combinations of L, R, N, and $\Theta$. For example, if the speed of rotation is selected as 10,000 rpm (1047 rad/s), L as 18 inches (457.2 mm), $\Theta$ as 4.25 degrees (0.0742 rad), then R must be 0.221 foot (2.66 inches or 67.56 mm) for a rate of absorption of $3.84 \times 10^{-3}$ pounds per second (1.74 g/s). The mean thickness of film "d" on tapered absorber wall 7 at this higher speed is 1.21 mils (0.031 mm). practical design considerations place restrictions on the values of L, R, N, and $\Theta$ for RAHP applications. When the device is employed as purely a chemical contact reactor, speeds in excess of 100,000 rpm (10,472 rad/s) may be selected whereupon small physical sizes result even for viscous liquids.

The preferred length to mean absorber radius ratio (L/R) for stationary applications is about three, whereas for mobile applications the preferred ratio is about 7. The stationary RAHP's are designed to emphasize energy performance and are intended to operate at speeds below 2400 rpm (251 rad/s), whereas mobile RAHP's are designed to emphasize size and are intended to operate at speeds above 3600 rpm (377 rad/s).

An examination of the rate of absorption expression reveals that the rate of absorption will approach zero as the value of the absorber wall taper angle theta approaches zero because the sine of theta also approaches zero. It is, therefore, desirable to make theta as large as possible consistent with good design practice. However, theta cannot exceed the arctan 2R/L because then the absorbent cooler 5 would be eliminated because of simple geometric considerations. For a value of L/R of 2, theta cannot exceed 45.0° (0.785 rad); for L/R=3, theta cannot exceed 33.7° (0.588 rad); for L/R=7, theta cannot exceed 15.9° (0.278 rad); and for L/R=10, theta cannot exceed 11.3° (0.197 rad). The consequence of these restrictions on RAHP capacity is not severe since, at the smallest angle of 11.3° (0.197 rad), the machine capacity is still 66.5% of the theoretical maximum capacity which occurs when the value of theta is 90.0° (1.571 rad). For the example cited, wherein theta is 4.25° (0.0742 rad), the machine capacity is still 52.2% of theoretical.

Implicit in the rate of absorption expression is the thickness of the very thin film "d". The very thin film thickness "d" is inversely proportional to the square root of the absorber rotational speed N, and directly proportional to the one-fourth power of the L/R ratio divided by sine of theta. Consequently, below values of theta of about 0.1° ($1.745 \times 10^{-3}$ rad), film thicknesses "d" exceed 5 mils (0.127 mm) for values of L/R=3 at operating speeds below 2400 rpm (251 rad/s) which conditions represent stationary RAHP's, and for values of L/R=7 at operating speeds around 3600 rpm (377 rad/s) which conditions typify mobile RAHP's. Film "d" thicknesses in excess of 5 mils (0.127 mm) are not very thin when considered in the context of RAHP technology. At the limiting values of theta and at an absorber rotational speed of 3600 rpm (377 rad/s), for L/R=2 and theta=45.0° (0.785 "d" is 0.84 mil (0.021 mm); for L/R=3 and theta=33.7° (0.588 rad), "d" is 0.99 mil (0.025 mm); for L/R=4.5 and theta=24.0° (0.418 rad), "d" is 1.19 mils (0.030 mm); for L/R=7 and theta=15.9° (0.278 rad), "d" is 1.46 mils (0.037 mm); and, for L/R=10 and theta=11.3° (0.197 rad), "d" is 1.74 mils (0.044 mm). At an absorber rotational speed of 1200 rpm (125.7 rad/s), the values of "d" must be multiplied by 1.732; and, at an absorber rotational speed of 10,800 rpm (1031.0 rad/s), the values of "d" must be divided by 1.732. All values of "d" are given for lithium bromide/water absorbent/refrigerant systems at concentrations and temperatures typical of RAHP's.

Because the evaporator is concentric and coextensive with the absorber in the present invention, it must fulfill its vapor generation and cooling functions within the dimensional constraints imposed by the absorber. The most severe constraint is the vaporization of refrigerant liquid within condenser/evaporator tube 37 under the influence of very high centrifugal force fields. As has been disclosed in my U.S. Pat. No. 5,123,479, evaporator heat transfer in high force fields can only occur where liquid wets the inner wall of the tube.

It has been established by testing that the heat transfer is convective for RAHP's of the present invention and that its value for tubes with about 50% of the inside volume occupied by refrigerant and for heat fluxes less than 20,000 Btu/hr-ft² (63,050 W/m²) is given by:

$$N_{Nu} = 0.1891(N_{Gr}N_{Pr})^{0.32}$$

where, $N_{Nu}$ is the Nusselt number, $N_{Gr}$ is the Grashof number, and $N_{Pr}$ is the Prandtl number; these numbers being determined for the refrigerant liquid at its operating temperature, for the inside diameter of condenser/evaporator tube 37, and for the centrifugal force field to which the tube is subjected. Typically, for water refrigerant which has a low coefficient of cubical expansion at the evaporator working temperature, the internal heat transfer coefficient is about 400 Btu/hr-ft²-°F. (2271 W/m²-°C.) for stationary applications and about 650 Btu/hr-ft²-°F. (3691 W/m²-°C.) for mobile applications. In this case, about 10 square feet (0.929 m²) of internal evaporator tube area is required for each ton (3515 W) of cooling capacity for stationary applications and around 6 square feet (0.557 m²) of area is required for mobile applications.

The required internal evaporator tube area cannot be provided by utilizing a few very long tubes because, as a separate condition, adequate cross-sectional area within the evaporator tube must be provided for the flow of refrigerant vapor. An accurate accounting of the vapor flow area must be made because the evaporator tube does not operate sans refrigerant liquid. With water as the refrigerant, the preferred cross-sectional area for vapor flow is about 6 square inches (38.7 cm²) per ton (3515 W) of capacity. Consequently, a prohibition exists against the use of very small diameter but long absorbers, the exact limit being conditioned upon the selected refrigerant and the capacity of RAHP.

Appositionally, very large diameter but short absorbers are excluded because the need for tube headers seriously depletes the area available for heat transfer. Accordingly, the aforementioned L/R=3 preferred ratio for stationary and L/R=7 preferred ratio for mobile applications is apropos for water refrigerant; however, these ratios may vary somewhat for other refrigerants, the broad range being from about 2 to about 10.

In order to preserve performance, it is important to keep unnecessary heat flow between components to a minimum and to prevent the absorbent from mixing with the refrigerant. With respect to the former, the role of perforated plastic sheath 9 in preventing the hotter absorber 1 and absorbent cooler 5 from preheating the influent air to evaporator 4 has been disclosed. Generator insulating barrier 21 is made from a material with low thermal conductivity such as tetrafluoroethylene, chlorotrifluoroethylene, polyvinylidene fluoride, and polycarbonate; materials which are chemically inert and possess good high-temperature properties. Alternatively, a generator insulating barrier 21 may be constructed of a composite consisting of an outer shell with the inner space filled with an insulating material.

The temperature spectrum of the components of the present invention is in decreasing temperature order, generator, absorbent cooler, condenser, absorber, and evaporator. The generator may be 200° F. (111.1° C.) higher in temperature than the absorber and the pressure within the generator may be more than 5 psi (258.6 torr) higher than the pressure within the absorber. Teflon (tetrafluoroethylene) is the preferred material of construction for generator insulating barrier 21 because of its low thermal conductivity and its good mechanical properties at the anticipated generator operating temperatures.

Insulation-packed absorbent transfer tube 20 conveys hot absorbent from generator 2 through the center of absorber 1 and into the absorbent cooler 5. It also must isolate the absorber from generator pressure in addition to minimizing the heat loss from the hot absorbent while it is passing through the absorber. As shown in FIG. 3A absorbent transfer tube 20 consists of an outer tube 20a and a concentric inner tube 20c; the inner annulus so formed contains several concentric layers of reflective metal foil 20b and is evacuated to a very high vacuum.

Absorbent cooler 5 operates at a temperature below that of the generator and slightly higher than that of the condenser; however, all three components operate at the same internal pressure. Consequently, absorber insulating barrier 26 has imposed on it the same requirements, albeit less stringent, as the generator insulating barrier 21 and additionally materials such as polystyrene, polyethylene, and polyamide are suitable.

Evaporator 4 vapor passes through evaporator exhaust tube 44 which, in turn, passes through absorbent cooler 5. The evaporator vapor is more than 100° F. (55.6° C.) cooler than the saturation temperature of the generator vapor. In order to prevent condensation of generator vapor on evaporator exhaust tube 44, insulating sleeve 34 is installed as illustrated in FIGS. 1A and 3.

Evaporator 4 is more than 100° F. (55.6° C.) cooler than condenser 3 and the heat flow from the condenser to the evaporator is minimized by providing an isolation section in the region of isolation section perforation 61 as illustrated in FIG. 1A. Insulating plug 39 is inserted into condenser/evaporator tube 37 and located within the isolation section. The preferred material of construction of the insulating plugs is Teflon, although other materials of construction may be equally satisfactory.

Because of the negative pressure (suction pressure) exerted by the condenser fan action, air passes inwardly in the isolation section and into isolation section perforation 61, thereby reducing the temperature of the wall of condenser/evaporator tube 37 and, in the process, reducing the heat flow from condenser 3 to evaporator 4.

The absorbent must not be allowed to enter the condenser and evaporator because the operating temperature of each component would be increased. Absorbents such as lithium bromide, which has a melting point of 1022° F. (550° C.), and lithium iodide, which has a melting point of 840° F. (449° C.), possess vapor pressures at nominal generator operating temperatures so low that vapor phase carryover of absorbent to the condenser is negligible. Carryover of liquid absorbent during normal operation is prohibited by the position of refrigerant vapor entrance 35 and evaporator exhaust tube 44 which are well removed from the nominal levels of absorbent within absorbent cooler 5 and generator 2 as illustrated in FIGS. 1A and 1B.

In order to prevent egress of refrigerant from condenser/evaporator tube 37 array during shutdown, check valve 82 closes off the evaporator exhaust tube 44 during shutdown, as shown in FIG. 1A. As illustrated in FIG. 4, check valve 82 is held shut by a leaf spring in the absence of centrifugal forces. As a consequence, the aforementioned liquid levels represent a quantity of absorbent which is not increased by mixing with refrigerant upon shutdown and the position of refrigerant vapor entrance 35 and evaporator exhaust tube 44 are well removed from the asymmetrical disposition of absorbent when the RAHP is not rotating.

A further consequence of check valve 82 is that the energy intensive process of producing the liquid refrigerant inventory does not have to be repeated every time the RAHP cycles. Furthermore, the response time to effective cooling after RAHP startup is considerably shortened. Because the inventory of liquid absorbent is uncharacteristically small, which is an intrinsic attribute of the very thin film employed in the absorber and relatively thin film employed in the generator, the operating dynamics of the RAHP's of the present invention are similar to those of VCHP's.

OPERATION

The operation of the present invention may be best described by referring to FIGS. 1A-B and employing FIGS. 2 through 6 to clarify specific details. Lithium bromide is selected as the absorbent and water is selected as the refrigerant for specificity; however, other refrigerants and other absorbents possessing deliquescent properties with respect to refrigerants may be selected.

For example, the bromides, iodides and hydroxides singly or in combination, of certain group Ia metals of the Periodic Table of the Elements are a preferred group of candidates for use in the RAHP. Typical examples are: lithium chloride, lithium chlorate, lithium perchlorate, lithium iodide, sodium hydroxide, cesium fluoride, cesium hydroxide, potassium fluoride, potassium hydroxide, rubidium fluoride, and rubidium hydroxide. Calcium chloride, calcium bromide, calcium iodide, magnesium bromide, magnesium chloride and magnesium iodide also may be used.

Other refrigerant liquids which may be used as solvents for the solid absorbents are anhydrous liquid ammonia; the lower aliphatic alcohols such as methanol, ethanol, propanol, etc.; ethers such as diethyl ether; ketones such as acetone, methyl ethyl ketone, and the higher ketones; esters such as ethyl acetate; hydrocarbons such as ligroin, benzene and toluene; chlorinated hydrocarbons such as chloroform; alkanoic acids such as acetic acid and propionic acid; and alkylene glycols such as ethylene glycol and glycerol.

Additionally, there may be used the new combinations of absorbent/refrigerant which are set forth in U.S. Pat. Nos. 3,296,814, 3,524,815 and 4,475,352. Particularly suitable as absorbent solutions are the aqueous solutions of lithium bromide and lithium iodide wherein the lithium iodide is about 30% to 40% by weight of the total salt content in accordance with the teachings of U.S. Pat. No. 3,524,815.

The RAHP is initially evacuated of all air and other noncondensible gases by means of a vacuum pump attached to evacuation/charge opening 50 located in absorber bearing shaft 31. Subsequently, a dilute solution of predetermined concentration of lithium bromide and degassed water is charged into the machine through evacuation/charge opening 50, all as illustrated, for example, in FIG. 8 of U.S. Pat. No. 3,740,966. The opening then is hermetically sealed.

The machine is mounted for rotation on outboard absorber bearing 32 and outboard generator bearing 14 and connected to a motor capable of achieving RAHP unit rotational speeds of from, for example, 500 to 4000 rpm (52.4 to 418.9 rad/s), depending on the size and characteristics of the installation. Annular nozzles 83 and 84, are provided to direct hot air into the generator fins 79 and to extract cooled air therefrom. Sheet metal shrouds, as previously described, are provided which wrap around the condenser and the evaporator components in order to collect and direct condenser and evaporator effluent air.

The dimensional proportions of the RAHP shown in FIGS. 1A and 1B represent those of a device designed for stationary use, (L/R=3). For the example cited herein, the selected rotational speed is 1200 rpm (125.7 rad/s). Hot waste gas ranging anywhere from 40 SCFM (68.0 m$^3$/h at 800° F. (427° C.) to 800 SCFM (1359.2 m$^3$/h at 320° F. (160° C.) is required to pass through the generator 2 external fin passages for each ton (3515 W) of cooling capacity. Without momentarily accounting for irreversible losses and, additionally, fixing the completion efficiency in the absorber at 92%, the heat input to the generator is determined to be 22,940 Btu/hr (6,719 W) for each ton (3515 W) of capacity. At the equilibrium absorbent film temperature of 275° F. (135° C.), the lithium bromide concentration in the pitot tube reservoir 55 is 66 weight percent. At this temperature and concentration, the equilibrium water vapor pressure within the generator is 4.46 psia (230.6 torr).

For each ton (3515 W) of capacity, 125.3 pounds per hour (15.79 g/s) of dilute absorbent must enter generator 2 at circumferential lip 23. 112.8 pounds per hour (14.21 g/s) of 66 weight percent absorbent must be pumped into absorbent transfer tube 20 from pitot tube reservoir 55 by pitot tub pump 17. The mass-flow rate deficit between absorbent input to the generator and output from the generator is 12.5 pounds per hour (1.58 g/s) of refrigerant vapor that must exit the generator through refrigerant vapor entrance 35 on its passage to condenser 3. The actual temperature of the vapor is 275° F. (135° C.), whereas the saturation temperature at its vapor pressure of 4.46 psia (230.6 torr) is 157.4° F. (69.7° C.); therefore, the vapor leaving the generator is superheated by 117.6° F. (65.3° C.) and the energy contained in 12.5 pounds (5.67 kg) of vapor superheated by this amount is 684 Btu (7.2×10$^5$J) or about 5.5% of the heat of condensation. By the addition of heat to generator 2, incoming diluted absorbent is separated into a concentrated absorbent fraction and a refrigerant vapor fraction.

The refrigerant vapor fraction enters condenser 3 through refrigerant vapor tube 67, off-set connecting tube 36, and condenser header 40. Airflow through the external condenser fins amounting to approximately 900 SCFM per ton (1529 m$^3$/h per 3515 W) of machine capacity removes the 684 Btu/hr (200 W) of superheat and 12,546 Btu/hr (3675 W) of heat of condensation from the 12.5 pounds per hour (5.67 kg/h) of superheated vapor and in the process liquifies the refrigerant at its saturation temperature of 157.4° F. (69.7° C.).

The high centrifugal forces present at the condenser 3 location during operation result in very high condensing coefficients within the condenser portion of condenser/evaporator tube 37 because the liquid film deposited as a consequence of condensation and high centrifugal force is extremely thin. A minor amount of liquid refrigerant "e" is retained within the condenser portion of condenser/evaporator tube 37 since the pressure within condenser 3 is more than 4 psi (206.8 torr) higher than the pressure within evaporator 4 and liquid trap 38 is designed so that the evaporator portion of condenser-/evaporator tube 37 is occupied by liquid to about 50% of its volume (as indicated by liquid level "b" in FIG. 1A and 3) at which condition the pressure difference between condenser 3 and evaporator 4 is fully compensated. Condenser drainage is assured by liquid trap 38 because of its siphon behavior during machine operation.

The liquid refrigerant enters evaporator 4 at the rate of 12.5 pounds per hour (5.67 kg/h). It evaporates at a temperature determined by the vapor pressure established by the absorber's performance. In the present instance, the vapor pressure is 0.22 psia (11.4 torr), the evaporator temperature is 56° F. (13.3° C.), and the capacity is one ton (3515 W) for an evaporator airflow of 540 SCFM (917.5 m$^3$/h) at a sensible heat factor of 0.76; the airflow being proportionally higher for higher capacities as is the case for the refrigerant flow rate into the evaporator.

Returning to the generator, concentrated absorbent fraction collects in pitot tube reservoir 55 to a liquid level "c", FIG. 1B. It is pumped from this location into absorbent transfer tube 20 by pitot tube pump 17. Absorbent transfer tube 20 is of relatively large inside diameter in order to avoid crystallization difficulties during transient operating conditions. Obviously, it also permits free passage of superheated refrigerant vapor into absorbent cooler 5. Concentrated absorbent fraction accumulates in absorbent cooler 5 to a liquid level "a" FIG. 1A. Liquid level "a" is variable because the sum of the static head of concentrated absorbent relative to pressure reducing slot 33, enhanced by centrifugal forces, plus the pressure drop through pressure reducing slot 33 must equal the pressure difference between the generator vapor pressure and the absorber vapor pressure, or 4.46−0.22=4.24 psi or 219.2 torr.

Within absorbent cooler 5, the free surface of the concentrated absorbent fraction represented by liquid level "a" is at a temperature of 275° F. (135° C.). Because the concentrated absorbent liquid is a poor thermal conductor, its temperature near cooled, tapered absorber wall 7 is approximately 160° F. (71.1° C.); the disparity being tolerated because the colder fluid and, therefore, the more dense fluid, naturally seeks the farthest radial position during machine rotation.

The presence of a liquid inventory, indicated by liquid level "a", the variability of the liquid level, and the inherent existence of the aforementioned temperature gradient are features of the absorbent cooler design which enable it to protect the absorber from generator pressure and temperature transients. The absorbent cooler reduces the temperature of 112.8 pounds (51.17 kg) of concentrated absorbent from 275° F. (135° C.) to about 160° F. (71.1° C.) each hour and in the process dissipates 5540 Btu (5.8×10$^6$J)) of thermal energy. This thermal energy is conducted through that portion of tapered absorber wall 7 located in absorbent cooler 5, through the proximate array of absorber fin 8, and into about 800 SCFM 1359 m$^3$/h) of incoming absorber cooling air. The greater than 65° F. (36.1° C.) thermal driving potential is more than sufficient to convey the heat from the absorbent within absorbent cooler 5 to the incoming airstream which is initially at a temperature of 95° F. (35° C.).

The concentrated absorbent liquid migrating from liquid level "a" towards tapered absorber wall 7 establishes a flow gradient in the direction of pressure reducing slot 33 located at the periphery of absorber insulating barrier 26. Absorber insulating barrier 26 is fixed in axial position by third transfer tube flange 27 and second transfer tube flange 25. Accordingly, at operating temperature, the expansion of absorber insulating barrier 26 closes the normal assembly clearance around its periphery. Consequently, absorbent flow can pass only through the array of pressure reducing slots 33. In this manner, a uniform series of thin films of concentrated absorbent enters absorber 1 and immediately merge to form a single, uniform, very thin film.

The 66 weight percent absorbent is at about 160° F. (71.1° C.) as it enters the absorber. The equilibrium vapor pressure of 66 percent of lithium bromide at 160° F. (71.1 ° C.) is 12.56 torr (0.243 psia) and the absorber (at 92% completion) vapor pressure at 58.7 surface weight percent of lithium bromide and at 125° F. (51.7° C.) is 11.4 torr (0.22 psia). Therefore, as the concentrated absorbent enters the absorber, there will be some minor flashing of refrigerant from the absorbent until the temperature of the absorbent becomes equilibrated.

As vapor is absorbed by the concentrated absorbent, energy is liberated at the rate of 16,170 Btu (1.7×10$^7$J) per ton (3515 W) of cooling capacity. The vapor is absorbed by a 0.0029 inch-thick (0.074 mm) film "d" when the selected taper angle is 4.25 degrees (0.0742 rad) and the rotational speed is 1200 rpm (125.7 rad/s) This very thin film travels at the average speed of 0.40 foot per second (121.9 mm/s) against the inner surface of tapered absorber wall 7 from absorber insulating barrier 26 to generator insulating barrier 21. During this rapid transit, 12.5 pounds per hour (1.58 g/s) of very low pressure refrigerant vapor must be absorbed by the very thin film and 16,170 Btu/hr (4736 W) of heat must be dissipated from the very thin film. The vapor is absorbed through a process called mass diffusion and the heat is dissipated by means of a process called thermal diffusion. Both processes are intolerably slow, especially in viscous liquids possessing very low thermal conductivities. The practical sizes of the absorbers of the present invention are made possible only by the use of very thin films which beneficially restrict the distance mass and heat must diffuse.

The absorber function is obverse to that of the generator. The influent to the generator is dilute absorbent liquid and the effluents are concentrated absorbent liquid and pressurized refrigerant vapor. The driving stimulus is the application of heat. The influents to the absorber are concentrated absorbent liquid and low pressure refrigerant vapor and the effluent is dilute absorbent liquid. The driving stimulus is the continuous removal of heat.

In the absorber, as the very thin film moves from absorbent cooler 5 to generator 2, its concentration changes from 66 weight percent to an average concentration of 59.5 weight percent; whereas in the generator, as the relatively thin film moves from circumferential lip 23 to pitot tube reservoir 55, its concentration increases from an average of 59.5 weight percent to 66 weight percent.

As a consequence, in the absorber both the concentration and the temperature of the absorbent film decrease as the film moves from the absorbent cooler towards the generator along tapered absorber wall 7. In the generator both the concentration and temperature of the absorbent film increase as the film moves axially from circumferential lip 23 towards pitot tube reservoir 55. In both the absorber and generator, at any axial location, the surface concentration of the absorbent film and its surface temperature must be in equilibrium with the vapor pressure. Therefore, as the concentration decreases, the temperature of the absorbent also decreases. The converse also is true.

Absorbent at a temperature of about 125° F. (51.7 ° C.) and a concentration of 59.5 weight percent leaves absorber 1 by annular passage 52, radial slot 53 array, and enters generator 2 by circumferential film - promoting slot 54 array. The equilibrium vapor pressure of the mixed absorbent at the stated temperature and concentration is 0.201 psia (10.38 torr). It must be preheated before it is exposed to the high generator vapor pressure. Otherwise it will condense vapor and become even more diluted. Preheating of the dilute absorbent is accomplished by passage of absorbent through circumferential slot 54 which is extended by circumferential lip 23 to an axial length such that the heated generator shell 11 in combination with the absorbent film thickness within circumferential slot 54 permits the process of thermal diffusion to operate so as to increase the temperature of the absorbent from 125° F. (51.7 ° C.) to above the saturation temperature of 160° F. (71.1 ° C.).

The mass-flow rate of absorbent (as described hereinbefore, this in combination with the rate of absorption M determines the system constant C) for a given size of pitot tube orifice 15 is determined by the difference between the rotative speed of the RAHP and that of pitot tube pump 17. At the one extreme, pitot tube weight 16 maintains pitot tube pump 17 stationary while the RAHP rotates around it on pitot tube bearing 18; this is the condition for maximum mass-flow rate. It is obvious that if the rotative speed of pitot arm extension 49 is the same as the rotative speed of the RAHP then the mass-flow rate of absorbent will be zero. When the mass-flow rate of absorbent is zero, then the machine capacity will also be zero.

It can be shown that if the rotative speed of pitot tube pump 17 is 50% of the rotative speed of the RAHP, when both are rotating in the same direction, then the mass-flow rate of absorbent is also zero. Consequently, the mass-flow rate of absorbent and concomitantly the machine capacity can be controlled by controlling the torque exerted on pitot arm extension 49. At the conditions established for the instant operation description, the pitot tube pump must provide a mass-flow rate of 112.8 pounds of absorbent per hour (51.17 kg/h) per ton (3515 W) of machine capacity. The true circulation ratio is 112.8/12.5=9.0, which is the preferred value of 8.3 corrected for 92% completion efficiency; i.e., 8.3/0.92=9.0.

The coefficient of performance in the cooling mode is the ratio of the heat input to the evaporator divided by the heat input to the generator which for the described operation is 12,000 Btu/hr: 22,940 Btu/hr=0.523. The coefficient of performance in the heating mode is the ratio of heat output of the absorber, absorbent cooler, and condenser all divided by the heat input to the generator which is 16,170 Btu/hr+5,540 Btu/hr+13,230 Btu/hr: 22,940 Btu/hr=1.523. For the RAHP design disclosed, a reduction in the circulation ratio will increase the coefficients of performance in both the cooling and heating modes.

The inventory of absorbent contained in the absorber and generator thin-films weighs less than 0.25 pound (113.4 g) per ton (3515 W) of capacity. This is the minimum inventory of lithium bromide absorbent required to carry the aforedescribed absorption cycle forward. Consequently, some absorbents which otherwise would be too costly to use in more conventional absorption systems will find application in the RAHP's herein described.

The embodiment set forth in the preceding description is a special case of a generic class of rotary absorption heat pumps for use in stationary, portable, and mobile applications. As is evident, this class of heat pumps is adaptable to a sealed and unitized construction which is of great advantage during the manufacture, distribution, and installation of this equipment. However, should it prove beneficial, the cooling of the absorber or condenser or both may be relegated to a separate piece of equipment in a manner synonymous to that of existing residential split-system heat pumps. Furthermore, it is understood that the specificity of the presentment was necessary for clarity. The instant invention is not restricted to such variables as the method of heating the generator; the absorbent and refrigerant employed; the method of providing rotation to the machine; the method of constructing the liquid trap between the condenser and evaporator; the method of controlling the circulation ratio; and the selection of construction material, except as may be limited by the scope of the subjoined claims.

I claim:

1. A rotary absorption heat pump assembly comprising a generator (2), condenser (3), evaporator (4), absorbent cooler (5), and absorber (1) having infeed and outfeed ends, and means operatively associating the same to function as components of an absorption type heat pump, and mounting means for mounting the heat pump components for rotation as a unit, the absorber (1) comprising a hollow frustum of a right circular cone, outwardly tapering in the downstream direction and adapted to receive and process an absorbent solution in the form of a very thin film ("d") of substantially uniform thickness, the absorber (1), absorbent cooler (5), and generator (2) being arranged centrally end-to-end and the condenser (3) and evaporator (4) being arranged end-to-end peripherally outside of the absorber and absorbent cooler, substantially concentric therewith.

2. The heat pump assembly of claim 1 wherein the angle of taper of the absorber, as measured with respect to its axis of rotation (51), is from about 0.1° (0.001745 rad) to less than arctan of twice the mean radius of the absorber divided by its axial length.

3. The heat pump assembly of claim 1 wherein the angle of taper of the absorber, as measured with respect to its axis of rotation (51), is from about 2.0° (0.0349 rad) to about 7.0° (0.1222 rad).

4. The heat pump assembly of claim 1 wherein the very thin film thickness ("d") is from about 0.5 mils (0.0127 mm) to about 5.0 mils (0.1270 mm).

5. The heat pump assembly of claim 1 wherein the very thin film thickness ("d") is from about 0.5 mils (0.0127 mm) to about 5.0 mils (0.1270 mm), the taper angle, as measured with respect to the axis of rotation, is from about 2.0° (0.0349 rad) to about 7.0° (0.1222 rad), and the length to mean radius ratio of the conical absorber (1) is from about 2 to about 10.

6. The heat pump assembly of claim 1 wherein the absorber (1) and generator (2) are arranged in end-to-end abutting relationship and wherein the infeed end of the absorber is closed with a first isolation/insulation barrier and its outfeed end with a second isolation/insulation barrier,
   there being provided in the first barrier a plurality of peripheral openings (33) in juxtaposition to the interior wall (7) of the absorber for feeding absorbent solution to said interior wall in film-forming relation.

7. The heat pump assembly of claim wherein the absorber (1) and generator (2) are arranged in end-to-end abutting relationship and wherein the infeed end of the absorber is closed with a first isolation/insulation barrier and its outfeed end with a second isolation/insulation barrier,
   there being provided in the first isolation/insulation barrier a plurality of peripheral openings (33) in juxtaposition to the interior wall (7) of the absorber for feeding absorbent solution to said interior wall in filmforming relation,
   and wherein a downstream second isolation/insulation barrier is provided with a plurality of peripheral openings (54) arranged to deliver absorbent solution in the form of a thin film to the interior peripheral surface of the generator (2).

8. The heat pump assembly of claim 1 wherein the condenser (3) and evaporator (4) comprise a plurality of elongated tubes (37) and combination liquid trap means (38) and insulating plug means (39), which divide each tube internally into a condenser section (3) and an evaporator section (4).

9. The heat pump assembly of claim 1 wherein the interior tapered surface (7) of the absorber (1) is provided with a plurality of longitudinally extending partitions or baffles (85), circumferentially spaced and dividing the interior surface into non-communicating separated areas for maintaining the uniformity of thickness of the very thin absorbent film ("d") during operation of the assembly.

10. The heat pump assembly of claim 9 wherein the height of the baffles or partitions 85 is about twice the thickness of the film ("d").

11. The heat pump assembly of claim 1 including variable capacity pump means for transferring concentrated absorbent solution from the generator (2) to the absorbent cooler (5).

12. The heat pump assembly of claim 11 wherein the pump means comprises pitot pump means (17).

13. The heat pump assembly of claim 1 including check valve means (82) installed between the evaporator (4) and absorber (1) and operative to prevent egress of refrigerant from the evaporator to the absorber during shut down of the assembly.

14. The heat pump assembly of claim 13 wherein the check valve means (82) comprises valve means opened by centrifugal action and closed by spring pressure.

15. The heat pump assembly of claim 1 including a charge of absorbent/refrigerant predetermined to maintain during operation of the assembly operational amounts of charge in the generator, condenser, evaporator, absorbent solution cooler and absorber components of the assembly.

16. The rotary heat pump assembly of claim 15 wherein the charge comprises lithium bromide and water.

17. The rotary heat pump assembly of claim 15 wherein the charge comprises a crystallization-resistant mixture of lithium bromide, lithium iodide and water, the lithium iodide comprising from about 30% to about 40% by weight of the total salt content of the charge.

* * * * *